(12) United States Patent
Dellacona

(10) Patent No.: US 6,260,155 B1
(45) Date of Patent: Jul. 10, 2001

(54) NETWORK INFORMATION SERVER

(75) Inventor: Richard Dellacona, Riverside, CA (US)

(73) Assignee: QUAD Research, Riverside, CA (US)

( * ) Notice: Subject to any disclaimer, the term of this patent is extended or adjusted under 35 U.S.C. 154(b) by 0 days.

(21) Appl. No.: 09/071,282

(22) Filed: May 1, 1998

(51) Int. Cl.[7] .................................................. G06F 11/00
(52) U.S. Cl. .................................................. 714/4; 714/46
(58) Field of Search .................................. 714/2, 4, 6, 7, 714/8, 13, 14, 25, 30, 39, 46, 47; 370/220, 226; 709/238, 239, 242; 710/102, 103; 380/255; 702/130, 142, 146; 375/354

(56) References Cited

U.S. PATENT DOCUMENTS

| | | |
|---|---|---|
| 4,347,563 | 8/1982 | Paredes et al. . |
| 4,590,554 | 5/1986 | Glazer et al. . |
| 4,710,926 | 12/1987 | Brown et al. . |
| 4,773,313 | 9/1988 | Anson . |
| 4,819,159 | 4/1989 | Shipley et al. . |
| 4,871,324 * | 10/1989 | Brune et al. ........................... 439/189 |
| 5,005,122 | 4/1991 | Griffin et al. . |
| 5,134,619 | 7/1992 | Henson et al. . |
| 5,140,689 | 8/1992 | Kobayashi . |
| 5,151,989 | 9/1992 | Johnson et al. . |
| 5,155,729 | 10/1992 | Rysko et al. . |
| 5,157,663 | 10/1992 | Major et al. . |
| 5,157,771 | 10/1992 | Losi et al. . |
| 5,185,693 | 2/1993 | Loftis et al. . |
| 5,210,855 | 5/1993 | Bartol . |
| 5,210,866 | 5/1993 | Milligan et al. . |
| 5,218,697 | 6/1993 | Chung . |
| 5,227,778 | 7/1993 | Vacon et al. . |
| 5,249,293 | 9/1993 | Schreiber et al. . |
| 5,255,367 | 10/1993 | Bruckert et al. . |
| 5,265,098 | 11/1993 | Mattson et al. . |
| 5,271,013 | 12/1993 | Gleeson . |
| 5,277,615 | 1/1994 | Hastings et al. . |
| 5,287,461 | 2/1994 | Moore . |
| 5,297,067 | 3/1994 | Blackborow et al. . |
| 5,343,358 * | 8/1994 | Hilbrink ............................... 361/700 |
| 5,343,477 | 8/1994 | Yamada . |
| 5,369,757 | 11/1994 | Spiro et al. . |
| 5,386,567 * | 1/1995 | Lien et al. ............................ 710/103 |
| 5,390,326 | 2/1995 | Shah . |

(List continued on next page.)

FOREIGN PATENT DOCUMENTS

| | | |
|---|---|---|
| 0 653 759 A2 | 5/1995 | (EP) . |
| 0 709 779 A2 | 5/1996 | (EP) . |
| 0760503A1 * | 3/1997 | (EP) . |
| 0 760 503 A1 | 3/1997 | (EP) . |

OTHER PUBLICATIONS

Copy of International Search Report Relating to PCT/US99/07284 Dated Sep. 01, 1999.

Primary Examiner—James P. Trammell
Assistant Examiner—Pierre Eddy Elisca
(74) Attorney, Agent, or Firm—Fulwider, Patton Lee & Utecht

(57) ABSTRACT

The information server system provides a scalable expansion capability, due to the implementation of a unique mid-plane connector board for all components of the information server system that allows for multiply mirrored components to significantly improve fault tolerance of the server system. An integrated diagnostics monitoring subsystem eliminates the incompatability problems previously associated with performing diagnostics of the server system. A method is also provided for increasing the throughput rate of the user communications interface by installing a hash table database in the end user computer system to bypass a similar but slower function in the end user modem, to place the bulk of the transmission reception load on the main CPU, and synchronizing the modem with the transmission speed of the server unit.

18 Claims, 4 Drawing Sheets

U.S. PATENT DOCUMENTS

| | | |
|---|---|---|
| 5,394,526 | 2/1995 | Crouse et al. . |
| 5,408,649 | 4/1995 | Beshears et al. . |
| 5,410,691 | 4/1995 | Taylor . |
| 5,412,723 | 5/1995 | Canetti et al. . |
| 5,423,042 | 6/1995 | Jalili et al. . |
| 5,430,876 | 7/1995 | Schreiber et al. . |
| 5,434,994 | 7/1995 | Shaheen et al. . |
| 5,442,749 | 8/1995 | Northcutt et al. . |
| 5,446,736 | 8/1995 | Gleeson et al. . |
| 5,450,578 | 9/1995 | Mackenthun . |
| 5,450,583 | 9/1995 | Inada . |
| 5,452,448 | 9/1995 | Sakuraba et al. . |
| 5,454,080 | 9/1995 | Fasig et al. . |
| 5,455,953 | 10/1995 | Russell . |
| 5,459,863 | 10/1995 | Taylor . |
| 5,471,099 | 11/1995 | Larabell et al. . |
| 5,471,634 | 11/1995 | Giorgio et al. . |
| 5,475,813 | 12/1995 | Cieslak et al. . |
| 5,479,653 | 12/1995 | Jones . |
| 5,488,716 | 1/1996 | Schneider et al. . |
| 5,502,836 | 3/1996 | Hale et al. . |
| 5,504,882 | 4/1996 | Chai et al. . |
| 5,513,314 | 4/1996 | Kandasamy et al. . |
| 5,517,632 | 5/1996 | Matsumoto et al. . |
| 5,518,418 | 5/1996 | Larabell . |
| 5,522,031 | 5/1996 | Ellis et al. . |
| 5,530,905 | 6/1996 | Nichols et al. . |
| 5,537,642 | 7/1996 | Glowny et al. . |
| 5,542,087 | 7/1996 | Neimat et al. . |
| 5,544,339 | 8/1996 | Baba . |
| 5,546,583 | 8/1996 | Shriver . |
| 5,548,712 | 8/1996 | Larson et al. . |
| 5,548,724 | 8/1996 | Akizawa et al. . |
| 5,564,040 | 10/1996 | Kubala . |
| 5,566,297 | 10/1996 | Devarakonda et al. . |
| 5,579,222 | 11/1996 | Bains et al. . |
| 5,579,491 | 11/1996 | Jeffries et al. . |
| 5,581,552 | 12/1996 | Civanlar et al. . |
| 5,592,611 | 1/1997 | Midgely et al. . |
| 5,600,644 | 2/1997 | Chang et al. . |
| 5,603,029 | 2/1997 | Aman et al. . |
| 5,604,803 | 2/1997 | Aziz . |
| 5,606,719 | 2/1997 | Nichols et al. . |
| 5,608,865 | 3/1997 | Midgely et al. . |
| 5,617,540 | 4/1997 | Civanlar et al. . |
| 5,621,795 | 4/1997 | Baker et al. . |
| 5,630,007 | 5/1997 | Kobayashi et al. . |
| 5,642,515 | 6/1997 | Jones et al. . |
| 5,644,698 | 7/1997 | Cannon . |
| 5,652,908 | 7/1997 | Douglas et al. . |
| 5,655,152 | 8/1997 | Ohnishi et al. . |
| 5,664,106 | 9/1997 | Caccavale . |
| 5,664,119 | 9/1997 | Jeffries et al. . |
| 5,675,723 | 10/1997 | Ekrot et al. . |
| 5,680,538 | 10/1997 | Jones et al. . |
| 5,692,128 | 11/1997 | Bolles et al. . |
| 5,694,581 | 12/1997 | Cheng . |
| 5,696,965 | 12/1997 | Dedrick . |
| 5,701,406 | 12/1997 | Matsumoto et al. . |
| 5,706,458 | 1/1998 | Koppolu . |
| 5,732,137 | 3/1998 | Aziz . |
| 5,732,240 | 3/1998 | Caccavale . |
| 5,734,831 | 3/1998 | Sanders . |
| 5,734,898 | 3/1998 | He . |
| 5,737,549 | 4/1998 | Hersch et al. . |
| 5,737,747 | 4/1998 | Vishlitzky et al. . |
| 5,740,371 | 4/1998 | Wallis . |
| 5,740,423 | 4/1998 | Logan et al. . |
| 5,784,576 * | 7/1998 | Guthrie et al. ......................... 710/103 |
| 5,893,140 * | 4/1999 | Vahalia et al. ......................... 711/118 |
| 5,966,510 * | 10/1999 | Carbonneau et al. .................. 714/44 |
| 5,974,503 * | 10/1999 | Venkatesh et al. ...................... 714/6 |

\* cited by examiner

FIG. 3
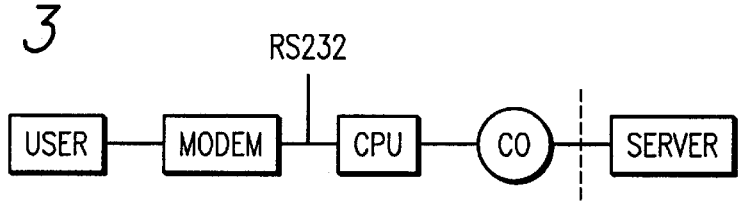
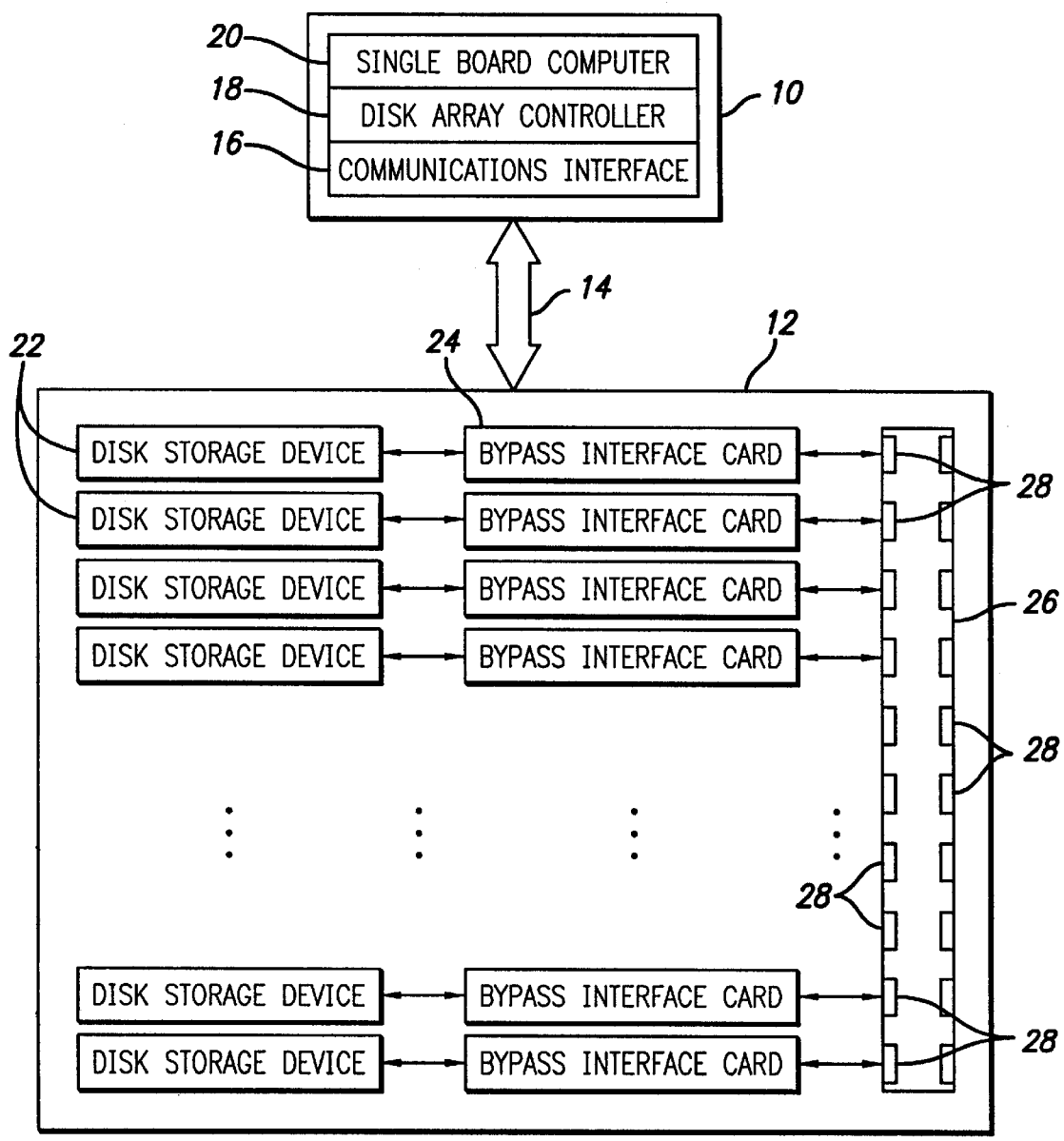
FIG. 4

NETWORK INFORMATION SERVER

BACKGROUND OF THE INVENTION

1. Field of the Invention

This invention relates to a high speed, microprocessor based fault tolerant mass storage information server system, and more particularly concerns an integrated, fault tolerant, four-way mirrored Internet server system, including hot swappable components connected to a midplane connector, combining communication, routing and switching functions with scalable storage, and an integrated system monitoring diagnostics computer subsystem.

2. Description of Related Art

Conventional information server systems, including Internet server systems, have been able to provide only limited scalability to accommodate increased storage requirements, and have typically required a power-down of the information server system to facilitate installation of additional disk storage devices or communications components. The shut down and installation of additional or replacement components to an information server system commonly requires a significant amount of system administrator personnel time and resources to facilitate system maintenance, and for such tasks as expansion of storage space, repair, and routine maintenance, such as optimization and system monitoring.

Conventional information server systems also have limited fault tolerance, and typically employ a disk array server which incorporates extra disk space substantially in excess of that needed by the information server system. The extra disk space is incorporated into such systems by the addition of disk storage devices. However, conventional backplane technology typically has been limited to allowing up to eight disk drives in an individual server. Multiple server units could be linked to increase the capacity of an information server system, and this type of multiple server configuration also allowed only a limited amount of fault tolerance. Typically, if one server failed, information directed to the server would be directed to the next server in line for the registration, and so on from one server to the next. However, each time the information was rerouted, timing out was required, resulting in compounding of delays as information was transferred from one server to another. Prior art systems also balanced the load among clustered servers by utilizing a load balancing program, which, however, required an operator to manually run a diagnostics program on each server and manually switch servers.

Depending upon the nature of a component failure, corrective action with prior art systems can include removal and replacement of a completely or partially failed device. Such system maintenance typically requires that the entire server system be taken off-line, and powered down before the physical replacement operation can be performed. Some information server systems permit "hot swapping," the removal and replacement of a component in a system while the power is on and the system is operating. Such systems still typically require considerable hands-on intervention of the system administrator personnel to manually manipulate the hardware interfaces and operating system software for purposes of physically and logically reintegrating the newly replaced disk device or other component into the server system.

The process of logical reintegration of even a "hot swappable" component into a server system typically requires a significant portion of the CPU and memory resources of the server system. For installation of a disk storage device, such resources are needed to reallocate the available free disk space into the logical disk configuration of the server, and to redistribute the multiple copies of the information stored on the server across the new and remaining physical and logical disk drives. Such demands on the resources of the server system can temporarily severely decrease the performance of the information server system. There is therefore clearly a need for a fault tolerant information server system that allows for the rapid removal of failed or failing components, and the integration of either replacement components or additional components into the server system, while the power is on and the system is operating, without a significant drain upon the resources of the server system.

With reference to FIG. 1, illustrating a prior art server hardware configuration, a conventional information server system includes a variety of components from different manufacturers and utilizing different protocols, frequently causing incompatibility problems in performing diagnostics of the entire server system.

Such a server system typically is connected to receive user calls, forwarded to the server system by a central office (CO) through a normal telephone line (POTS) carrier line to a modem, such as a modem available from U.S. Robotics, for example, interfaced with a terminal server such as those provided by Livingston, for example, and a hub for connecting several computers or networks together, such as those provided by Kingston, for example. The hub is connected to a communications system, such as that provided by CISCO, and a router such as that provided by ADTRAN, which is in turn interfaced to the network (WWW).

Such prior art network interface systems have serious limitations in their adaptability and flexibility, and must be directly managed by skilled personnel who are knowledgeable about how to effectively maintain availability of the network interface in the face of the complex relationships of the hardware used. Often, the only way to achieve reasonable reliability is to provide large amounts of redundancy as well. All of the above contributing to a great deal of expense in the requisition and maintenance of a network interface system. The present invention solves these and many other problems.

SUMMARY OF THE INVENTION

Briefly, and in general terms, the present invention provides for an information server system that provides a wide array of reconfigurable options as well as scalable expansion capability, due to the implementation of a unique mid-plane connector board for all components of the information server system. The information server system can thus be readily assembled and integrated with multiply mirrored components to significantly improve fault tolerance of the server system. In addition, the information server system of the invention provides an integrated diagnostics computer subsystem and fully hot swappable components that eliminate problems of degradation of server system performance by replacement or addition of components to the server system. In addition, the integrated diagnostics computer subsystem eliminates the incompatability problems previously associated with performing diagnostics on the server system. The rate of end user communications reception can also advantageously be increased by a method for installing a hash table database in the end user computer system to bypass a similar but slower function in the end user modem, to place the bulk of the transmission reception load on the main CPU, and synchronizing the modem with the transmission speed of the server unit.

The invention accordingly provides for an information server system having a scalable, modular, fault tolerant, hot swappable architecture of a plurality of components for interfacing with a computer network such as the Internet, comprising a central processing unit, a communications interface subsystem connected to the central processing unit, a mass storage subsystem connected to the central processing unit, and a diagnostics computer subsystem connected to the central processing unit for monitoring when one of the plurality of components of the information server system is removed or added. In a presently preferred embodiment, the information server system further comprises a mid-plane connector board having a plurality of sockets for connecting the components on each side of the mid-plane connector board, and the components of the information server system are currently preferably connected to the mid-plane connector board of the information server system by interface cards. In a preferred aspect of the invention, the interface cards comprise circuitry to sense when the interface cards are failing or are being removed, and to generate a signal to the diagnostics subsystem of the information server system indicating that the component connected to the connector board by the interface card is to be taken off line, to allow the information server system to switch the components off as they are taken off-line, and to switch them on as they are placed on-line, allowing the information system to be fully hot-swappable. Each the component preferably has a unique electronic serial number recognized by the diagnostics subsystem, allowing the components to be integrated into the information server system.

In a currently preferred aspect, the information server system comprises multiply mirrored components to significantly improve fault tolerance of the information server system. The mid-plane connector board accordingly preferably has upper and lower sets of sockets, allowing for components to be mirrored left and right, and top and bottom, to significantly increase fault tolerance of the information server system. A plurality of mid-plane connector boards can be provided, allowing for expansion and scalability of the system.

In one presently preferred embodiment, the mass storage subsystem comprises a plurality of disk storage devices, and each of the plurality of disk storage devices is mounted on a bypass interface card that connects to a mid-plane connector board having a plurality of sockets for connecting interface cards for components on each side of the mid-plane connector board. The bypass interface cards are sequentially connectable together by jumper cables, so that a plurality of disk storage devices can be connected together. In a currently preferred aspect, the bypass interface cards include circuitry to sense when a bypass interface card is failing or is being removed, and to generate a signal to the diagnostics subsystem of the information server system indicating that the disk storage device connected to the connector board by the bypass interface card is to be taken off line, to allow the information server system to switch the disk storage components off as they are taken off-line, and to switch them on as they are placed on-line, allowing the information system to be fully hot-swappable. In one presently preferred embodiment, the mass storage subsystem comprises a fibre channel disk storage device array subsystem.

A presently preferred aspect of the information server system is that each of the components of the information server system has a unique serial number, and the diagnostics computer subsystem monitors the serial numbers for the components on-line. In another preferred aspect, the diagnostics computer subsystem is connected to a plurality of temperature sensors that are provided to monitor temperature zones throughout the information server system. In another preferred aspect of the invention, the information server system comprises a fan, and the diagnostics computer subsystem is connected to the fan for monitoring the fan speeds. In yet another preferred aspect, the information server system comprises a power supply, and the diagnostics computer subsystem is connected to the power supply for monitoring the electronic signature of the power supply.

The present invention also provides for a method for increasing the throughput rates of a user computer having a communications interface via a network with a host server system, the user computer communications interface including a modem of the type utilizing a database hash table for decryption of encrypted data received from the host server system. The method comprises the steps of installing a supplementary database hash table in the user computer to replace the function of the hash table in the modem, accessing the supplementary hash table installed in the computer for decryption of encrypted data received from the host server system, and synchronizing the modem with the transmission speed of the host server system. In one preferred aspect of the method, the step of synchronizing the modem with the transmission speed of the host server system comprises gradually increasing the setting of the throughput rate of the modem along with that of data transmission from the host server system. In another preferred aspect of the method, the step of synchronizing the modem with the transmission speed of the host server system further comprises detecting the throughput transmission rate change with a phase lock loop, in order to synchronize the user computer communications interface with the throughput rate of data transmissions from the host server.

These and other aspects and advantages of the invention will become apparent from the following detailed description and the accompanying drawings, which illustrate by way of example the features of the invention.

BRIEF DESCRIPTION OF THE DRAWINGS

FIG. 3 is a schematic diagram of a user interface with a central office connected via a network to an information server system;

FIG. 4 is a schematic diagram of an integrated information server system according to the present invention;

DETAILED DESCRIPTION OF THE PREFERRED EMBODIMENTS

Figure 1:
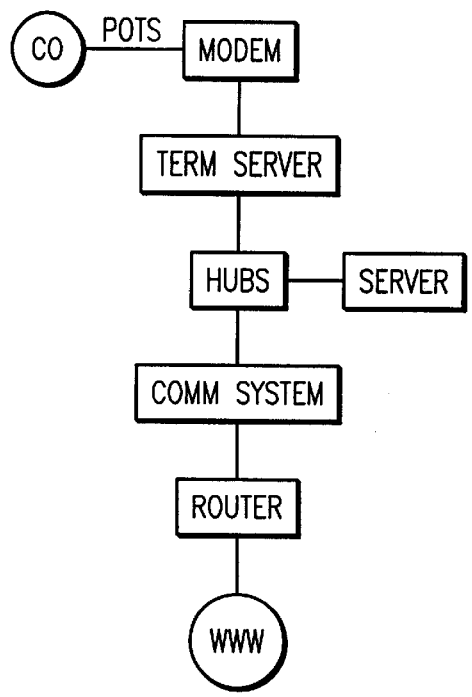
FIG. 1 is a schematic diagram of a prior art information server configuration.

Some conventional information server systems have limited fault tolerance, requiring the complete power-down of the information server system to repair component failures and permit the installation of additional devices. Conventional backplane technology also has limited the degree to which multiple mirroring of components can be provided in an individual server. While multiple server units could be linked, this type of multiple server configuration allowed only a limited amount of fault tolerance. Conventional information server systems are also commonly assembled from components from a multiplicity of non-standardized sources, and incompatability problems have commonly been encountered in performing diagnostics of such information server systems. The speed of transmission of network information to a user communications interface is also commonly limited by the capacity of the modems utilized at the user interface.

As is illustrated in the drawings, the invention is embodied in an improved information server system with a scalable, modular, fault tolerant, hot swappable architecture for interfacing with a network such as the Internet.

Figure 2:
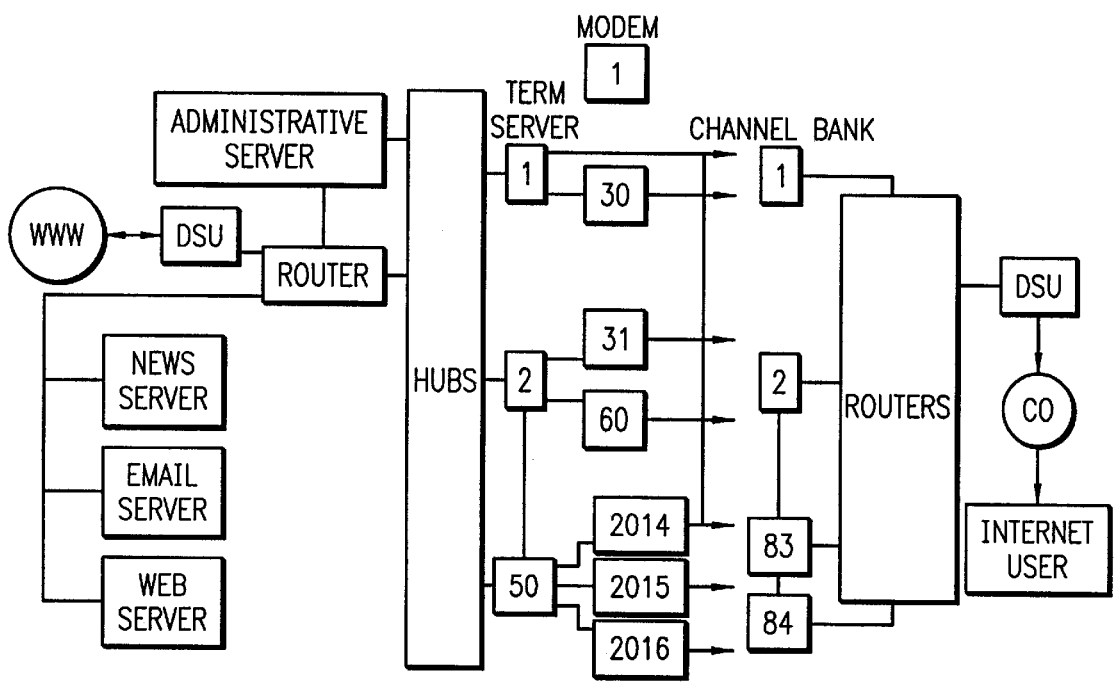
FIG. 2 is a schematic diagram of server hardware configuration according to the invention.

FIG. 2 is an illustration of a presently preferred server configuration, having one administrative server, 50 term servers, an email server, a news server and a web server, 50 term servers, 2016 modems, and 84 channel banks, connected to the network (WWW) by a digital server unit (DSU) and a router at one side, and connected to a central office and to the Internet user by routers and a DSU at the other side. In addition to such information server systems being assembled from components from a multiplicity of varied sources, system administrator personnel commonly utilize different types of proprietary software programs to perform diagnostics on the system, requiring different adapter configurations. A need exists to eliminate the incomparability problems previously associated with performing diagnostics of an information server system. The present invention solves those problems.

In addition, despite advances in speed and capacity of information server systems, the speed of transmission of network information is commonly limited by the capacity of the modems utilized at the user interface. With reference to FIG. 3, the client or user computer system is typically connected via a modem to the central office (CO), connected via a network to an information server system. The user modem contains a digital signal processing (DSP) chip and software installed in the DSP chip, containing a hash table encrypting an X-Y lookup table, such as for common characters transmitted. The hash table in the modem contains an array of pointers indexed by a hash function, used in a hashing scheme to provide rapid access to data items which are distinguished by a key. However, the size of the hash table in common modems is severely limited, thus, limiting the degree of compression that can be accomplished, and therefore the speed of the modem. Carrier transmission speeds can be increased by providing expensive, higher capacity modems, to provide significant transmission speed increases over normal telephone lines, such as is accomplished with T1 carriers, for example. However, it would be desirable to provide a server system and method implemented by the server system to allow a user computer and modem to receive transmissions from server systems at significantly higher speeds, without the need for physically replacing or upgrading a user modem with a more expensive, higher capacity modem. Referring to FIG. 4, the information server system 10 of the invention is typically connected to a fibre channel disk storage device array subsystem 12 connected to the information server subsystem by an integral Fibre Channel architecture compatible, high speed physical and virtual backplane bus and Intelligent Input/Output (I$_2$O) bus to an external bus 14. The information server further incorporates secondary subsystems including, but not limited to, a communications interface subsystem 16, a disk array controller subsystem 18, and a single board high speed computer (SBC) 20 utilizing a computer industry standard operating system software program, such as, for example, the operating system available under the trade name "WINDOWS NT" from Microsoft Corporation. The fibre store disk storage device array subsystem preferably utilizes an integrated, fault tolerant and scalable disk storage design, with a plurality of disk storage devices 22, with each disk storage device mounted on a bypass interface card 24 that connects to a unique vertical mid-plane connector board 26.

Each mid-plane connector board advantageously has sockets 28 for connecting interface cards for components on each side of the mid-plane connector board, and each mid-plane connector board further can have upper and lower sets of sockets, allowing for components to be mirrored left and right, and top and bottom, to significantly increase fault tolerance of the information server system. Multiple mid-plane connector boards can be utilized in the information server system, allowing for expansion and scalability of the system. Each of the bypass interface cards are sequentially connectable together by jumper cables, so that any number of disk storage. devices can be connected together to make the configuration scalable to up to any needed mass storage configuration, limited only by the size of space available for disk storage provided by the physical server case framework. As is further explained in greater detail below, the diagnostics subsystem monitors the serial numbers for the components on-line, and monitors when a component is removed or added. Each bypass interface card preferably includes circuitry to sense when a bypass interface card is failing or is being removed, and to generate a signal to the diagnostics subsystem of the information server system indicating that the individual is to be taken off line, to allow the information server system to switch the disk storage components off as they are taken off-line, and to switch them on as they are placed on-line, allowing the information system to be fully hot-swappable.

Figure 5:
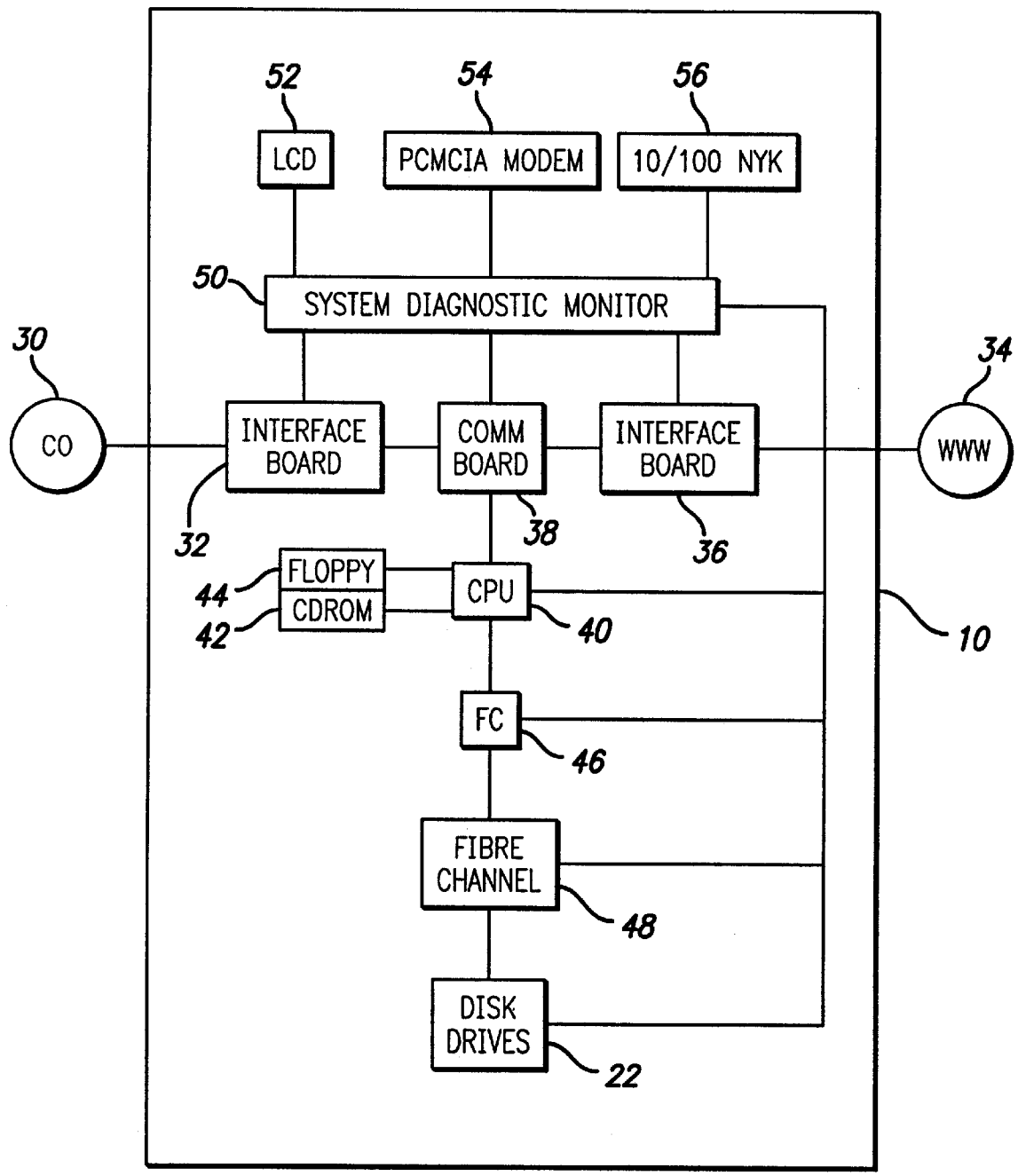
FIG. 5 is a more detailed schematic diagram of the integrated information server system of FIG. 4 according to the present invention.

Referring to FIG. 5, the information server system 10 typically is connected between users calling using the SS7 protocol, forwarded to the server system by a central office (CO) 30 through a T1 carrier line to a first interface board 32 that performs the functions of a digital service unit/channel service unit (DSU/CSU). The information server system is also connected to the network (WWW) 34 via a second interface board 36. The first interface board is connected to a communications subsystem board, or communication board 38, which in turn also communicates with the second interface board to the network. A typical information server system includes six dedicated communicationcards. The communication board and second interface board perform the routing functions of the information server system. The central processing unit (CPU) 40 is typically connected to receive input from a CD-ROM drive 42 and floppy disk drive 44, and communicates with the communication board and a fibre channel controller (FC) 46 for controlling the fibre channel 48, allowing the CPU to interface with the hard drives 22. The system diagnostics monitoring subsystem 50 is connected to monitor the interface boards, the communication board, the CPU, the FC and fibre channel, as well as the hard drives, and includes an LCD VGA touch screen 52, a PCMCIA modem 54 for remote access, and a 10/100 NIC card 56.

The dedicated system diagnostics monitoring subsystem 50 thus monitors all the cards and communications systems, over the 120. The system diagnostics monitoring subsystem 50 preferably comprises dual, left and right mirrored computers, each having a VGA LCD touch screen 52 for displaying a menu system for a complete diagnostics routine, with two computer interface cards on one mid-plane connector board, each card having a top and a bottom and left and right sections. The system diagnostics monitoring computers are typically connected to the front of the mid-plane connector board, and the I/O ports for the system diagnostics monitoring computers are typically connected at the back of the mid-plane connector board. A PCMCIA modem is provided to interface with the server system for remote access. Otherwise, all functions and tests can be performed via the touch screen. The diagnostic suite is preferably programmed in the integrated diagnostics subsystem, and eliminates the incompatability problems previously associated with performing diagnostics of the server system.

Figure 6:
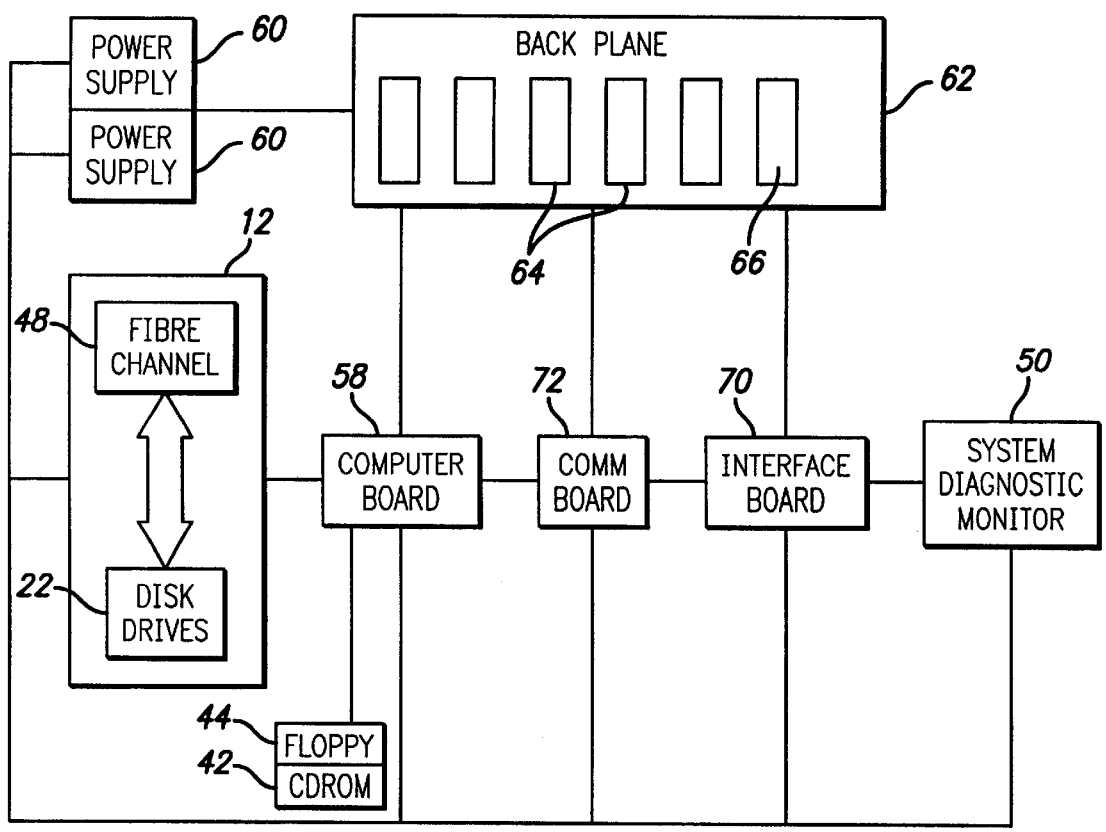
FIG. 6 is a more detailed schematic diagram of a typical embodiment of the integrated information server system of FIG. 4 according to the present invention.

As is illustrated in greater detail in FIG. 6, a typical configuration for the information server system of the invention includes a computer board 58, typically containing two mirrored CPU's 40, the system diagnostics monitoring subsystem 50, sections for dual power supplies 60, a back plane 62 with slots for power, and 5 peripheral slots (0–4) 64, including a slot 66 for a CD-ROM drive, fiber store mass storage subsystem 12 with dual power supplies (not shown), including multiple hard drives 22 on the bypass interface carrier board interfacing with the CPU's by a fiber channel 48. The hard drives preferably conduct predictive algorithms to transfer data to the other drives and shut down when they are about to fail. The information server case also preferably includes a CD-ROM drive 42 and floppy disk drive 44. Multiple modular interface boards 70 and modular communications boards 72 perform the routing functions of the information server system, and are preferably Field Programmable Gate Array (FPGA) based to be software configurable, and identified by serial number, allowing upgrades to be downloaded to the communications modules. The interface boards and communications modules are also preferably hot swappable modules that allow the information server system to be expandable without the need to reconfigure the system.

The diagnostics subsystem is also connected to as many as 40 temperature sensors, or more, to monitor temperature zones throughout the information server system. Typically four sensors are provided on each bypass interface card. In addition, the diagnostics subsystem is connected to the fans (not shown) and power supplies for monitoring the fan speeds and electronic signatures of the power supplies, i.e., by sampling the current drawn and voltage drop across the components, and comparing these measurements against measurements made when the units were new. If the electronic signature of a component varies by greater than 20%, the component is taken off line. The fan and power supply components are also preferably hot swappable, so that once they are identified as failed and off line, they can readily be replaced, without requiring any down time for the server unit.

The communications interface subsystem communicates with other subsystems of the information server on the above described buses and incorporates any combination of a number of widely available interface and communications tertiary subsystem circuit boards. The interface boards incorporate, among other components, digital service unit (DSU) framers which can include, for example, T-1 communications compatible DSU's such as the Model No. DS2152 chip set from Dallas Semiconductor Corp. The communications boards incorporate, among other components, multi-channel communications processors which can include, for example, the four channel "Quick-Chip" communications processor from Motorola Corp. The communications circuit board also includes onboard buffer memory and a high speed, fiber channel compatible, optical bus for intra-server-component high speed data communications, as well as fiber channel compatible compactPCI bridge circuitry such as the bridge chip set available from Tundra. Additionally, for improved communications diagnostic, status and monitoring capabilities, the communications board incorporates a bit error rate tester (BERT) chip set, such as the device available as Model No. DS2172 from Dallas Semiconductor, configured for communications with the SBC and operating system software, via the 120 bus. The communications interface subsystems are adaptable for compatibility with other network and telecommunications architectures, protocols and topologies, including, but not limited to, T-3, DS-3, OC-$3_c$, OC-$12_c$, OC-$192_c$, FDDI, SONET, SCSI, TCP/IP, HiPPI and ATM.

Figure 7:
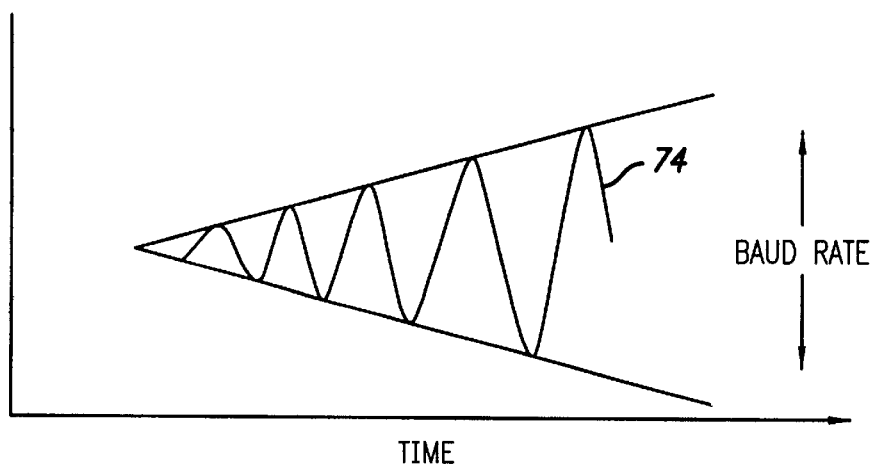
FIG. 7 is a graph illustrating the synchronization of a user communications interface with increased information server system transmission speeds according to the method of the invention.

In another aspect of the method of the invention for increasing the throughput rates of standard user communications interface, the present invention addresses the problem of enlarging the size of the hash table utilized by the user interface to allow significantly compression of the information being transferred, and consequently significant modem speed increases that can currently commonly only be achieved by installing a higher capacity modem with a larger hash table. According to the method of the invention, when the user logs on to the host server system, the host server system transfers an autoexec file to the user computer system, and instructs the user to turn off the computer, and to run the autoexec file on start up. The autoexec file installs a database hash table in the computer to replace the function of the hash table in the modem, and modifies the modem to access the hash table installed in the computer, placing the load of the hash table encryption on the main CPU, permitting expansion and updating and upgrading of an extended hash table to include commonly used terms, such as Internet terms, for example. As is illustrated in FIG. 7, in order to synchronize the modem with the server unit, the setting of the throughput rate 74 of the modem is gradually increased along with that of the transmission, ultimately allowing for approximately a quadrupling of the speed of the modem. The user modem detects the throughput transmission rate change with a phase lock loop, in order to synchronize the user communications interface with the increased throughput rate of the transmissions from the host server.

The operating system software incorporates enhancements adding functionality directed to control of the communications interface, disk array controller and single board computer. The SBC can include any of a wide number of suitable devices, including, but not limited to, the Compact-PCI CPU Board with Pentium processor, Model No. ZT 5510, available from Ziatech Corporation. Modifications to enhance performance of the ZT 5510 can include an onboard 40 Mb flash memory card for permanent storage of the non-reconfigurable portions of the operating system software, and an onboard removable PCMCLA 40 Mb flash memory card, "D2 FlashDisk" available from Sundisk Corporation, for read/writeable storage of the reconfigurable portions of the system software.

It will be apparent from the foregoing that while particular forms of the invention have been illustrated and described, various modifications can be made without departing from the spirit and scope of the invention. Accordingly, it is not intended that the invention be limited, except by the appended claims.

What is claimed is:

1. An information server system having a scalable, modular, fault tolerant, hot swappable architecture of a plurality of components for interfacing with a computer network such as the Internet, comprising:

a central processing unit;

a communications interface subsystem connected to the central processing unit;

a mass storage subsystem connected to the central processing unit;

a diagnostics computer subsystem connected to the central processing unit for monitoring when one of the plurality of components of the information server system is removed or added; and a mid-plane connector board having two opposing sides and a plurality of sockets for connecting the interface cards for the components on each said opposing side of the mid-plane connector board.

2. The information server system of claim 1, wherein the plurality of components of the information server system are connected to the mid-plane connector board of the information server system by interface cards .

3. The information server system of claim 2, wherein said interface cards comprise circuitry to sense when the interface cards are failing or is being removed, and to generate a signal to the diagnostics subsystem of the information server system indicating that the component connected to the connector board by the interface card is to be taken off line, to allow the information server system to switch the components off as they are taken off-line, and to switch them on as they are placed on-line, allowing the information system to be fully hot-swappable.

4. The information server system of claim 3, wherein each said component has a unique electronic serial number, allowing the components to be integrated into the information server system.

5. The information server system of claim 4, wherein said information server system comprises multiply mirrored components to significantly improve fault tolerance of the information server system.

6. The information server system of claim 1, wherein said mid-plane connector board has upper and lower sets of sockets, allowing for components to be mirrored left and right, and top and bottom, to significantly increase fault tolerance of the information server system.

7. The information server system of claim 6, comprising a plurality of mid-plane connector boards, allowing for expansion and scalability of the system.

8. The information server system of claim 1, wherein said mass storage subsystem comprises a plurality of disk storage devices.

9. An information server system having a scalable, modular, fault tolerant, hot swappable architecture of a plurality of components for interfacing with a computer network such as the Internet, comprising:

a central processing unit;

a communications interface subsystem connected to the central processing unit;

a diagnostics computer subsystem connected to the central processing unit for monitoring when one of the plurality of components of the information server system is removed or added; and a mass storage subsystem connected to the central processing unit; wherein said mass storage subsystem comprises a plurality of disk storage devices, and wherein each of said plurality of disk storage devices is mounted on a bypass interface card that connects to a mid-plane connector board having two opposing sides and a plurality of sockets for connecting interface cards for components on each said opposing side of the mid-plane connector board.

10. The information server system of claim 9, wherein each of said bypass interface cards are sequentially connectable together by jumper cables, so that a plurality of disk storage devices can be connected together.

11. The information server system of claim 10, wherein each of said bypass interface cards include circuitry to sense when a bypass interface card is failing or is being removed, and to generate a signal to the diagnostics subsystem of the information server system indicating that the disk storage device connected to the connector board by the bypass interface card is to be taken off line, to allow the information server system to switch the disk storage components off as they are taken off-line, and to switch them on as they are placed on-line, allowing the information system to be fully hot-swappable.

12. The information server system of claim 1, wherein said mass storage subsystem comprises a fibre channel disk storage device array subsystem.

13. The information server system of claim 1, wherein each of said components of the information server system has a unique serial number, and said diagnostics computer subsystem monitors the serial numbers for the components on-line.

14. The information server system of claim 1, further comprising a plurality of temperature sensors to monitor temperature zones throughout the information server system.

15. The information server system of claim 1, further comprising a fan, and wherein said diagnostics computer subsystem is connected to the fan for monitoring the fan speeds.

16. The information server system of claim 1, further comprising a power supply, and wherein said diagnostics computer subsystem is connected to the power supply for monitoring the electronic signature of the power supply.

17. A method for increasing the throughput rates of a user computer having a communications interface via a network with a host server system, the user computer communications interface including a modem of the type utilizing a database hash table for decryption of encrypted data received from the host server system, the method comprising the steps of:

installing a supplementary database hash table in the user computer to replace the function of the hash table in the modem;

accessing the supplementary hash table installed in the computer for decryption of encrypted data received from the host server system; and synchronizing the modem with the transmission speed of the host server system by gradually increasing the setting of the throughput rate of the modem along with that of data transmission from the host server system.

18. The method of claim 17, wherein said step of synchronizing the modem with the transmission speed of the host server system further comprises detecting the throughput transmission rate change with a phase lock loop, in order to synchronize the user computer communications interface with the throughput rate of data transmissions from the host server.

\* \* \* \* \*